United States Patent [19]

Shibayama et al.

[11] 4,202,391
[45] May 13, 1980

[54] TIRE FOR CONSTRUCTION VEHICLES

[75] Inventors: Toshiyuki Shibayama, Toyonaka; Kenji Nakakura, Nishinomiya, both of Japan

[73] Assignee: The Toyo Rubber Industry Co., Ltd., Osaka, Japan

[21] Appl. No.: 885,632

[22] Filed: Mar. 13, 1978

[30] Foreign Application Priority Data

Mar. 12, 1977 [JP] Japan .................. 52-27351

[51] Int. Cl.² ............................................. B60C 11/06
[52] U.S. Cl. ............................... 152/209 D; D12/136
[58] Field of Search ........ 152/209 R, 209 A, 209 NT, 152/209 WT, 209 D

[56] References Cited

U.S. PATENT DOCUMENTS

| D. 100,172 | 6/1936 | MacKusick | 152/209 D |
| 2,971,552 | 2/1961 | Williams | 152/209 D |

Primary Examiner—Richard A. Bertsch
Attorney, Agent, or Firm—Koda and Androlia

[57] ABSTRACT

A tire for construction vehicles including the lug type, the semi-lug type, and the block type with a ratio of 60–75 percent of the area of the projecting portion of the tread to the total area of the tread having the standard size of 16.00-25 or larger or the wide size of 20.5-25 or larger, wherein the size of the projecting portion of the tread is under the conditions specified by the following formulas:

$$1.0 \leq k \leq 1.3 \text{ at } \tfrac{1}{8} \text{ point}$$

$$1.0 \leq k \leq 1.6 \text{ at } \tfrac{1}{4} \text{ point}$$

said "k" designating the quotient of "a" the diameter of a maximum circle to be drawn within the width of the projecting portion by "h" designating the height of the grooves in the tread, and said $\tfrac{1}{8}$ point and $\tfrac{1}{4}$ point designating a point respectively $\tfrac{1}{8}$ and $\tfrac{1}{4}$ of the width of the tread from the end of the tread.

3 Claims, 13 Drawing Figures

TIRE FOR CONSTRUCTION VEHICLES

BACKGROUND OF THE INVENTION

1. Field of the Invention

This invention relates to a tire for construction vehicles with regular depth in the tread grooves including the standard aize of 16.00–25 or larger and the wide size of 20.5–25 or larger, and more particularly to a tire for high-speed construction vehicles with a bias-ply structure.

2. Prior Art

In general the tread patterns of a tire for construction vehicles are classified into three types; i.e., the regular type with regular depth in the grooves, the deep type with depth approximately 1.5 times deeper than the regular type, the extra-deep type with depth approximately 2.5 times deeper than the regular. For a high-speed vehicle, the regular type is considered to be the best, since the deep type and the extra-deep type have such a structure that the tread thereof is too thick for high-speed operation. As a construction vehicle, its tire has to have a good pulling capacity; therefore, the tread pattern has to be designed to this effect. More specifically, the rib type having circumferential grooves in the tread is not appropriate because of the lack of pulling capacity; the lug type having lateral grooves, the block type having grooves both lateral and circumferential forming a number of blocks, and the semi-lug type which is a combination of the rag type and the rib type are more suited for construction vehicles.

As to the carcass of tires, the radial ply structure is typically used for high-speed purpose. However, because of insufficient rigidity, the total operability as a construction vehicle sometimes is not satisfactory depending upon the operating conditions such as the road and weather conditions. On the other hand, the bias-ply structure tends to creat high temperature inside. Therefore, particularly when used for high-speed purpose, it is likely that the tire cause separation because of heat generated during high-speed running. In other words, the bias ply has a higher heat generating rate than the radial ply, since the ply cords of the former have more changes in the angle by compression and expansion from loading and unloading during rotation. Thus, the bias ply is considered to be unsuitable for high-speed running. Accordingly, there have been a number of proposals in an attempt to improve the heat-proof quality; for example, varying the mixing rate of tread gum, varying the design of the carcass to cut heat generation to an extent, and decreasing the thickness of the under-tread portion, namely, the thickness between the bottom of the grooves and the surface of the carcass to improve its heat releasing ability. Those attempts, however, have improved the heat-proof quality only 30 percent utmost and were not successful solution to the problem.

SUMMARY OF THE INVENTION

Accordingly, it is the primary object of this invention to provide a tire with a regular groove depth and a bias ply carcass for construction vehicles including the standard size of 16.00–25 or larger and the wide size of 20.5–25 or larger wherein the tire has the same quality on mechanical repeating aging effect, rigidity, anti-defacement effect, etc., while it has a better heat-release efficiency thereby giving a solution to the defects that the prior art tire for construction vehicles had during high-speed-running.

The tire of this invention has the basic structure of a bias ply tire for construction vehicles; typically, the tire comprises a number of ply alternately piled in opposite direction with the tire cords made of organic fibre covered with rubber directed at an angle of 26°–44° with the circumferential direction of the tire. This invention has been developed in the close study of the relationship between the temperature while running and the configuration of the projecting portion of the tread pattern, thereby having rendered the particular structure of this invention, which has excellent heat-release efficiency in addition to limited heat generation. Accordingly, this invention provides a tire for construction vehicles suited for high-speed running with the above mentioned advantages and the original nature of the bias ply tire that is advantageous in high-speed running.

In keeping with the principles of this invention, the objects of this invention are accomplished by having the configuration and size of the tread under the conditions as specified by the following formulas:

$1.0 \leq k \leq 1.3$ at $\frac{1}{8}$ point $1.0 \leq k \leq 1.6$ at $\frac{1}{4}$ point wherein "$\frac{1}{8}$" point and "$\frac{1}{4}$" point respectively designate a point on the circumference $\frac{1}{8}$ and $\frac{1}{4}$ of the width of the tread from the end of the tread toward the center of the tread, and k equals a/h; "a" designates the diameter of the possible largest circles to be drawn within the surface of the projecting portion of the tread, said circles having their centers on or around "$\frac{1}{8}$" point and "$\frac{1}{4}$" point and "h" designates the height of the grooves; i.e., the distance between the center of the circle on the surface of the projecting portion and the top of the under tread.

As to the ratio of the area of the projecting portion to the area of the total tread should be determined in a conventional manner; that is, for agricultural use, 15–30 percent, for traction use, 30–60 percent, and for rock type use, 60–75 percent. Since this invention relates to a tire for construction vehicles which is classified into the rock type, the ratio shall be within 60–75 percent.

BRIEF DESCRIPTION OF THE DRAWINGS

FIG. 1 (a) shows a plan view of a part of a rag-type tread pattern:

FIG. 1 (b) shows a cross-section view of a part of the tread shown in FIG. 1 (a);

FIG. 2 (a) shows a plan view of a part of a semi-ray type tread pattern:

FIG. 2 (b) shows a cross-section view of the tread shown in FIG. 2 (a);

FIG. 3 shows a graph on a coefficient of tire temperature at "$\frac{1}{8}$" point in relation to size of projecting portion of tread:

FIG. 3 (b) shows a graph of a coefficient of tire temperature at "$\frac{1}{4}$" point;

FIG. 4 (a) shows a graph on stress upon projecting portion at "$\frac{1}{8}$" point in relation to size of projecting portion:

FIG. 8 (a) shows a experimental model to test tire temperature;

FIG. 8 (b) shows a diagram of its application to tire lug.

DETAILED DESCRIPTION OF THE INVENTION

This invention shall be best explained by referring to the accompanying drawings.

Figure 1A:
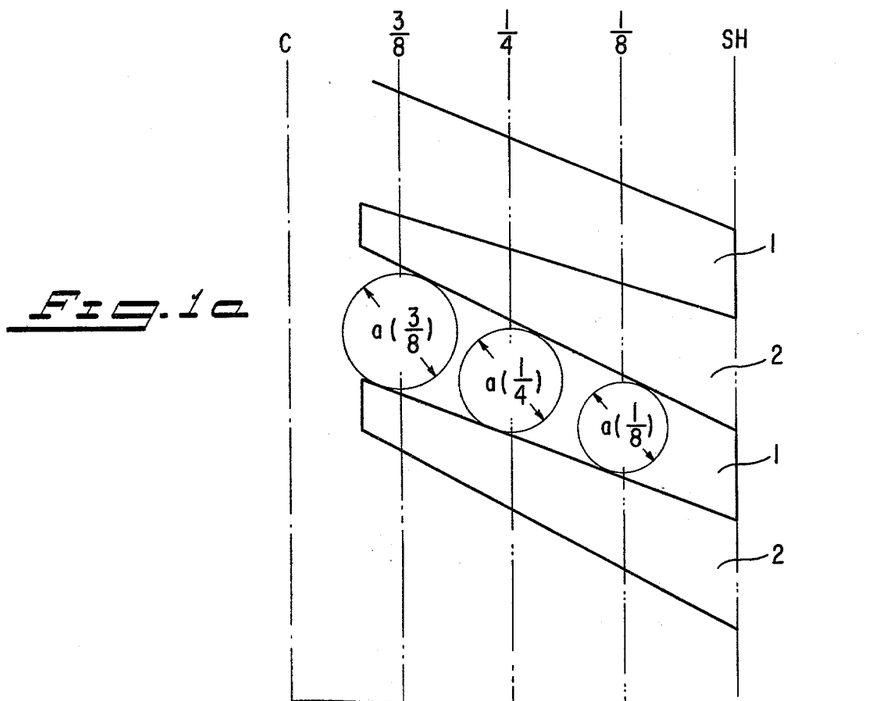
Figure 1B:
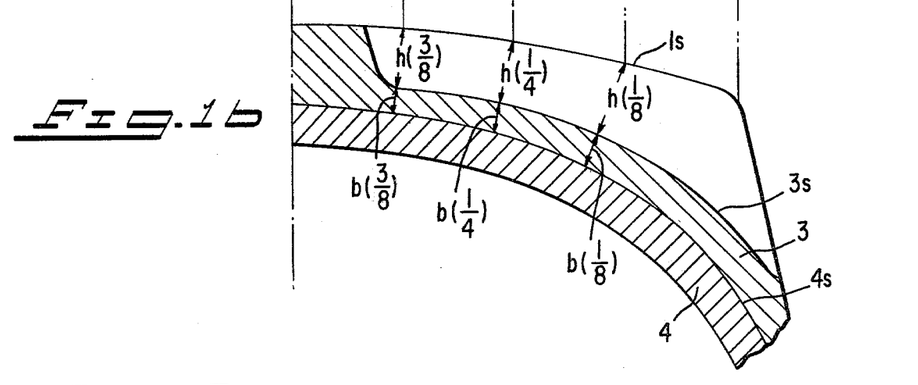
Figure 2A:
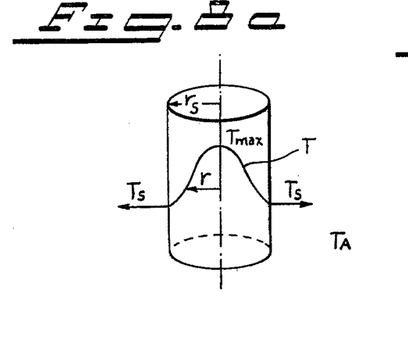
Figure 2B:
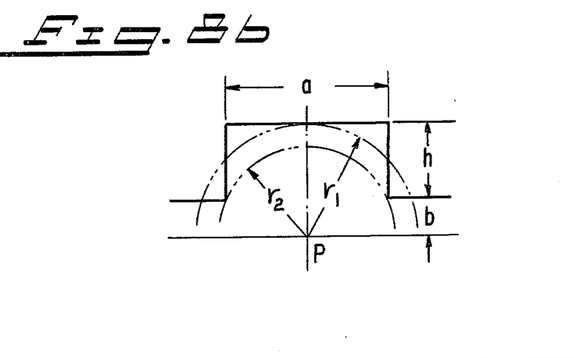

Referring to FIG. 1 showing a lug type tread pattern and FIG. 2 showing a semi-lug type tread pattern, there is illustrated the measurement on the tread pattern of this invention. Numeral 1 designates a projecting portion of a tire tread; i.e., a rag portion in FIG. 1 and a rib portion in FIG. 2. In the case of a block type pattern, 1 designates a block portion. Numeral 1s designates a tread surface, 2 designates a groove, and 3 designates an undertread; i.e. a portion from the bottom of the groove 2 to a carcass 4. 3s designates a bottom of the groove 2 or a surface of the under-tread 3, and 4s designates a surface of carcass.

Now referring specifically to FIG. 1, a flat projections of a tread is divided into eight sections, wherein a mark is noted such as "$\frac{1}{8}$" and "$\frac{1}{4}$" on every "$\frac{1}{8}$" point from a shoulder SH of the tread toward a center C; "a" designates a diameter of a circle, the center of which stands on "$\frac{1}{8}$", "$\frac{1}{4}$", . . . points or lines, said circle having maximum size allowable within the width of the projecting portion 1; "h" designates a height of the groove 2 measured along a line perpendicular to surface 3s; $h(\frac{1}{8})$, $h(\frac{1}{4})$ and $h(\frac{3}{8})$ respectively designates the height "h" at "$\frac{1}{8}$", "$\frac{1}{4}$" and "$\frac{3}{8}$" point. "b" designates a distance between the surface 3s of the under-tread and the surface 4s of the carcess along a line perpendicular to surface 3s; "$b(\frac{1}{8})$", "$b(\frac{1}{4})$" and "$b(\frac{3}{8})$" respectively designates the distance as defined above at "$\frac{1}{8}$", "$\frac{1}{4}$" and "$\frac{3}{8}$" point; "$a(\frac{1}{8})$", "$a(\frac{1}{4})$" and "$a(\frac{3}{8})$" respectively designates the diameter "a" of the circles whose center stands on "$\frac{1}{8}$", "$\frac{1}{4}$" and "$\frac{3}{8}$" point.

"k" designates a/h; "$h(\frac{1}{8})$", "$h(\frac{1}{4})$" and "$h(\frac{3}{8})$" respectively designates the "h" value at "$\frac{1}{8}$", "$\frac{1}{4}$" and "$\frac{3}{8}$". "$\gamma$" designates b/h; "$\gamma(\frac{1}{8})$". "$\gamma(\frac{1}{4})$" and "$\gamma(\frac{3}{8})$" respectively designats the "$\gamma$" value at "$\frac{1}{8}$", "$\frac{1}{4}$" and "$\frac{3}{8}$" point.

Referring to FIG. 2, the like symbols designates the like meanings, except that the circumferential rib portion as shown in the figure may not have the center of the circles standing on the dividing lines. In such a situation, the center of the circle shall be regarded as standing on a closest dividing line.

In a block type tread pattern, the same situation may happen as stated above in connection with the rib portion; in such case, the adjustment shall be made in the same manner.

Assuming that the amount of heat generated in the tire in a given time and volume and the mount of heat released through the surface of the tread in a given time, area and temperature are constant, the temperature in the tire is almost proportional to the temperature coefficient f shown in the following formula:

$$f = \frac{Nu}{32} k^2 + \frac{\sqrt{\gamma^2/k^2 + 1}}{2} k + \frac{2\gamma^2 + 2\gamma + 1}{8} Nu + \frac{1 + \gamma}{4} \quad [I]$$

wherein Nu represents Nusselt Number.

The above formula has been obtained by placing a rag portion of a rag type tread pattern into a cylindrical model and observing the temperature changes in the cylinder by presuming that the cylinder has a far larger height than the diameter in connection with the normal heat transferring effect including inside heat generating effect.

By presuming the following relationship:
"q" amount of heat generated in a given volume (cal/sec·cm$^3$)
T: temperature (°C.)
Ts: temperature on surface (°C.)
Ta: temperature outside atmosphere (°C.)
r: radius at a point to be freely selected (cm)
rs: radius of cylinder (cm)
the following formula will be reached:

$$T - Ta = q\left(\frac{r_s^2 - r^2}{4\lambda} + \frac{r_s}{2\alpha}\right) \quad [II]$$

wherein $\lambda$ designates that conductivity (cal/sec·cm·°C.) and $\alpha$ designates heat transmissibility (cal/sec·cm$^2$·°C.)

In FIG. 8(b), when being applied to a rag type tread pattern, "a", "h", and "b" have the same meanings as mentioned in connection with FIG. 1. Further, not only a cylinder model having a diameter r, for heat transmission toward the rag surface but also a cylinder model having a diameter r$_2$ for heat transmission toward the bottom of the grooves are considered and in both cases the highest temperature is at "P" point on the surface of carcass along the central line of the rag. In general, it has been known through experiment that heat tends to remain in the grooves and the heat trasnmissibility from the bottom to the surface is almost as little as a half of the heat transmissibility from the surface to the bottom. It is further recognized by experiments that the temperature of a tire is equal to the average of the temperatures reached by calculating the value obtained through the two cylinder models with a diameter of r$_1$ and r$_2$.

This relationship may be expressed by the following formula:

$$T_p = (T_{1max} + T_{2max})/2 \quad [III]$$

The following relationship is observed in FIG. 8(b):

$$r_1 = h + b, \quad r_2 = \sqrt{b^2 + a^2/4}$$

Furthermore, since b equals to $\gamma h$ (b=$\gamma h$), the following relationship is obtained:

$$r_1 = (1+\gamma)h, \quad r_2 = \sqrt{\gamma^2 h^2 + a^2/4}$$

When the above relationship on r$_1$ and r$_2$ is incorporated into the formula [II], the following relationship is obtained (r=0 at P point).

$$T_1max - Ta = q\left\{\frac{(1+\gamma)^2 h^2}{4\lambda} + \frac{(1+\gamma)h}{2\alpha}\right\} \quad [IV]$$

$$T_2max - Ta = q\left\{\frac{\gamma^2 h^2 + a^2/4}{4\lambda} + \frac{\sqrt{\gamma^2 h^2 + a^2/4}}{2\cdot\alpha/2}\right\} \quad [V]$$

From Formulas III, IV and V incorporated together, $$Tp - Ta = \frac{q}{2}\left[\frac{1}{4\lambda}\left\{(1+\gamma)^2 h^2 + \gamma^2 h^2 + \frac{a^2}{4}\right\} + \frac{1}{2\alpha}\left\{(1+\gamma)h + 2\sqrt{\gamma^2 h^2 + a^2/4}\right\}\right]$$

Further, a is equal to kh (a=kh); therefore, $$Tp - Ta = \frac{q}{2}\left[\frac{1}{4\lambda}\left\{\frac{h^2}{4}k^2 + (2\gamma^2 + 2\gamma + 1)h^2\right\} + \frac{1}{2\alpha}\left\{(1+\gamma) + 2\sqrt{\gamma^2 + k^2/4}\right\}h\right]$$

If f (temperature coefficiency) is equal to $$\frac{(Tp - Ta)\alpha}{qh}\left(f = \frac{(Tp - Ta)\alpha}{qh}\right)$$

$$f = \frac{\alpha h}{8\lambda}\left(\frac{k^2}{4} + 2\gamma^2 + 2\gamma + 1\right) + \frac{1}{4}(1 + \gamma + 2\sqrt{\gamma^2 + k^2/4})$$

Further, if Nu is equal to $\alpha h/\lambda$, $$f = \frac{Nu}{32}k^2 + \frac{\sqrt{\gamma^2/k^2 + 1/4}}{2}k + \frac{2\gamma^2 + 2\gamma + 1}{8}Nu + \frac{1+\gamma}{4}$$

In other words Formula [I] is obtained.

According to Formula [I], if γ and Nu are set, the tire temperature is expressed by a quadratic equation of k. Therefore, as k (k>o) increases, f increases.

Figures 2B, 3A, 3B:
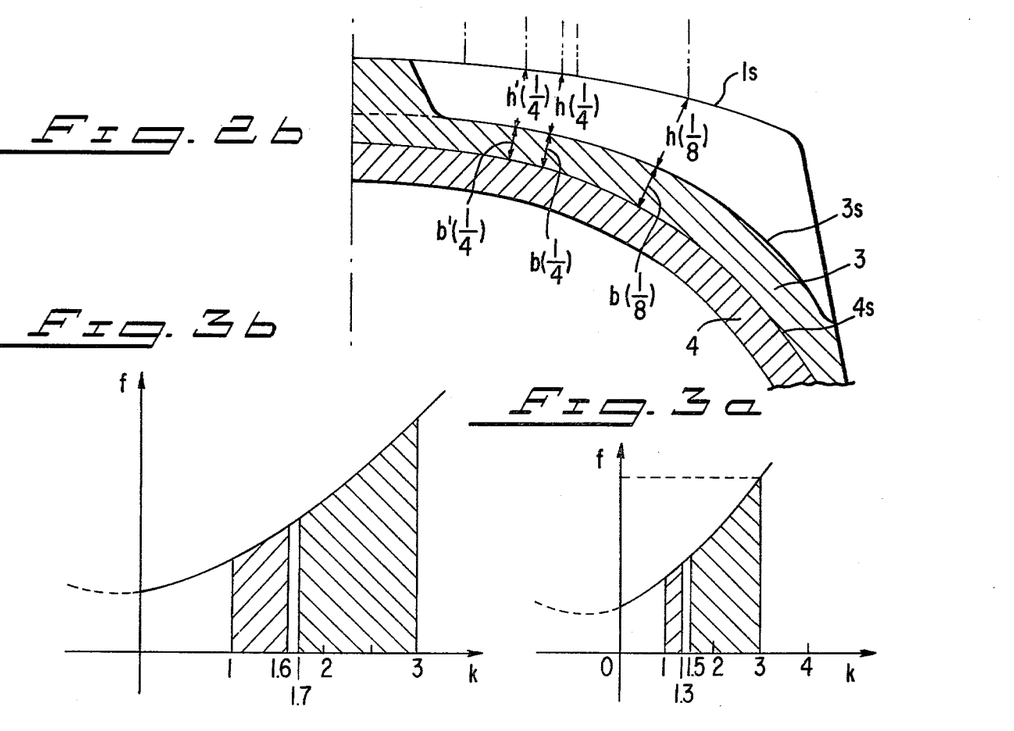

In other words, the smaller k is, the smaller f is, too; and the tire temperature will be lower. This is also clear from FIGS. 3(a) and (b) which show a graph of the temperature coefficient at ⅛ and ¼ point.

On the other hand, as k gets smaller, the tread loses its strength. Therefore, k must be kept in a appropriate value in this respect. In order to more specifically observe the value of k, the following formula is to be studied.

$$\sigma = (6F/lh)\cdot(1/k^2)$$

wherein σ is "stress" upon the projecting portion, F is tracting force toward the rotating direction of tire, l is width of tread, and h is depth of grooves.

In construction vehicles, 6F/lh is within 30–70 kg/cm² regardless of the size of a tire. Assuming D is equal to 6F/lh, $$\sigma = D/k^2$$

Figure 4A:
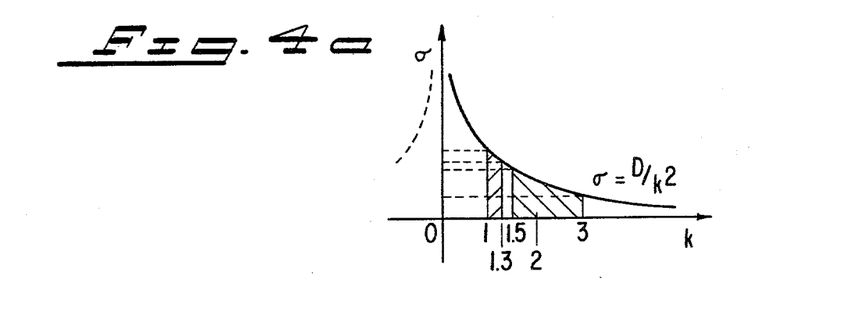
Figure 4B:
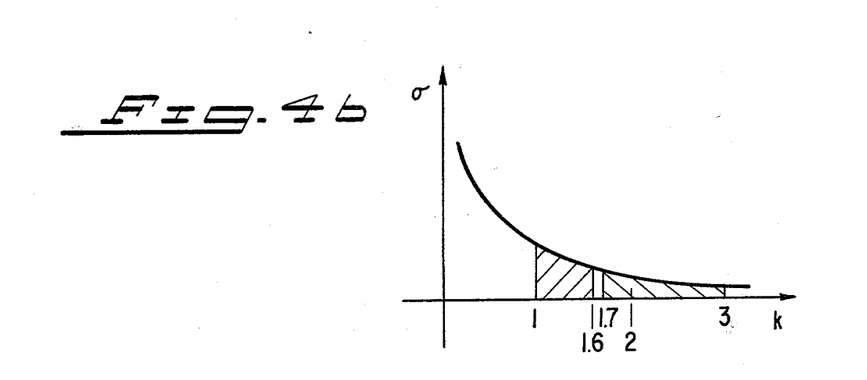
FIG. 4(b) shows a graph on stress upon projecting portion at "$\frac{1}{4}$" point.

Therefore, the stress upon the projection portion is inversely proportional to k² as indicated in the graph "stress" in FIGS. 4(a) and (b).

Figure 5:
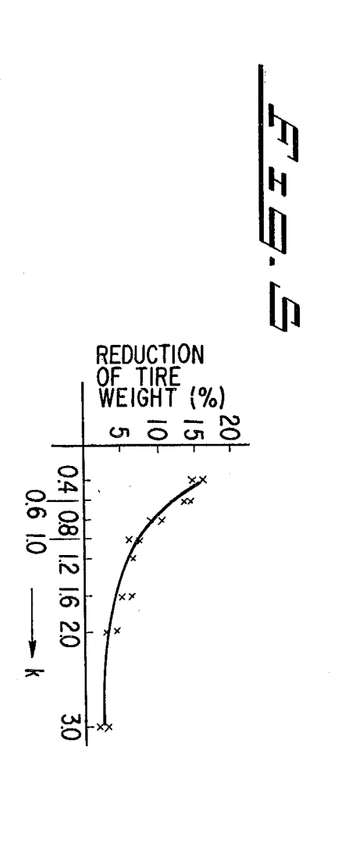
FIG. 5 shows a graph on pitching in relation to size of projecting portion of tread.

The test results on the pitching of tread are as follows:

Experiments were made by using a number of tires with a variety of k value wherein the size of the tires is 12.00-24, 24 PR and k values at ⅛ and ¼ point are the same. The reduction percentage of tire weight is observed after driving test with air pressure in tire 5 kg/cm², load 3,390 kg, driving speed of 35 km/hr, on a graveled road of 1 km for 300 hours. The results are as shown in FIG. 5 that indicates that pitching effect becomes heavy, as k gets smaller than 1. Accordingly, it is the logical conclusion in conjunction with FIG. 4 that the projecting portion of tread will have sufficient strength, if k is 1 or larger (k≧1).

The k value of the conventional tires, according to our survey, is within 3.0–1.5 at ⅛ point and 3.0–1.7 at ¼ point.

This invention has been developed by analyzing the total relationship among the stress, pitching effect, and the temperature coefficient respectively shown in FIGS. 4, 5 and 3 in search for a tire for construction vehicles which is as strong as the conventional tires and also has an improved heat release efficiency. In order to accomplish such purpose the tire of this invention has k value within 1.3–1.0 at ⅛ point and 1.6–1.0 at ¼ point.

The total size of the projecting portion is determined in such a manner that in the case of a lug type as shown in FIG. 1, for example, is the size toward the end and the center of the tread be set along the line extending the circumference of the circles having the center at ⅛ and ¼ point. When the tread has sub-grooves having the width of 10 mm or larger and the depth more than a half of main grooves, "f" value, reached through Formula [I] by incorporating a, h and γ between the sub-grooves and the main grooves, has to be within the area that is corresponding to the f value (temperature coefficient based upon the k value as mentioned above).

The ratio of the area of the projecting portion to that of the total tread must be within 60–70 percent as stated hereinabove.

The test results on h, γ=b/h, Nu and D value of the convention tires including the standard size of 16.00-25 and the wide size of 20.5-25 are as shown in Table I.

TABLE I

| Tire Width | | ⅛ Point | | ¼ point | | Nu Value | D Value |
|---|---|---|---|---|---|---|---|
| Standard | Wide | h mm | γ | h mm | γ | 15km–65km/hr. | (Kg/cm²) |
| 16.0 | 20.5 | 27–30 | 0.23–0.4 | 28–49 | 0.14–0.4 | 2.5–30 | 30–70 |
| 18.0 | 23.5 | 30–33 | " | 31–54 | " | " | " |
| 21.0 | 26.5 | 34–37 | " | 35–61 | " | " | " |
| 24.0 | 29.5 | 37–44 | " | 38–67 | " | " | " |

TABLE I-continued

| Tire Width | | ⅛ Point | | ¼ point | | Nu Value | D Value |
|---|---|---|---|---|---|---|---|
| Standard | Wide | h mm | γ | h mm | γ | 15km-65km/hr. | (Kg/cm²) |
| 27.0 | 33.25/33.5 | 41–45 | " | 42–74 | " | " | " |
| 30.0 | 37.25/37.5 | 45–50 | " | 46–81 | " | " | " |
| 33.0 | — | 49–54 | " | 50–88 | " | " | " |
| 36 | — | 53–58 | " | 54–95 | " | " | " |
| 40.0 | — | 53–58 | " | 54–95 | " | " | " |

EXAMPLE

To test the tires of this invention, a sample tire was formed with a size 16.00–25 and a lug type tread pattern. The mechanical condition at air pressure in tire of 5 Kg/cm² were as follows:

| | |
|---|---|
| Outer diameter: | 1,492 mm |
| Width: | 449 mm |
| Width of tread (straight/curved): | 370/383 |
| a(⅛): | 47 mm |
| h(⅛): | 41 mm |
| k(⅛): | 1.15 mm |
| a(¼): | 51.5 mm |
| h(¼): | 34 mm |
| k(¼): | 1.51 mm |

The tire had a carcass ply with 1260 d/2 of 66 nylon cords, wherein the inner ply was 14, outer ply was 4, the braker was 840 d/2 of 66 nylon cords, and the cords angle was within 36°–33°.

The mechanical property of tread gum was as shown in Table 2.

TABLE II

| | |
|---|---|
| Hardness | 50°–75° |
| Tensile Strength | 200–300 Kg/cm³ |
| Expansion | 500–700% |
| Tearing Strength | 50–150 Kg/cm |
| 300% Modulus | 50–200 Kg/cm² |
| Heat Generation | 10°–30° C. |

The heat generation test was done in accordance with ASTM D 623 and under the conditions of load: 11.8 Kg, stroke: 4.45 mm, atmospheric temperature: 40° C. The tire had h(⅛) of 41 mm, γ(⅛) of 0.24, k(⅛) of 1.k5; Nu was 4.2708 according to the following calculation.

$$Nu = h\alpha/\gamma = 4.2708$$

presuming $\alpha = 6.25 \times 10^{-4}$ cal/cm²·sec·°C. and $\lambda = 6.0 \times 10^{-4}$ cal/cm/sec·°0 C.

Incorporating those values shown above into Formula [I], there is obtained "f" value at ⅛ point as f = 1.62.

For the purpose of comparison to the conventional tires, the mechanical properties of those conventional tires were resumed.

The results were:

| | |
|---|---|
| h(⅛): | 43 mm |
| γ(⅛): | 0.39 |
| k(⅛): | 2.21 |
| h(¼): | 2.7 |
| Nu: | 4.4792 |
| f(⅛): | 2.80 |

Figure 6:
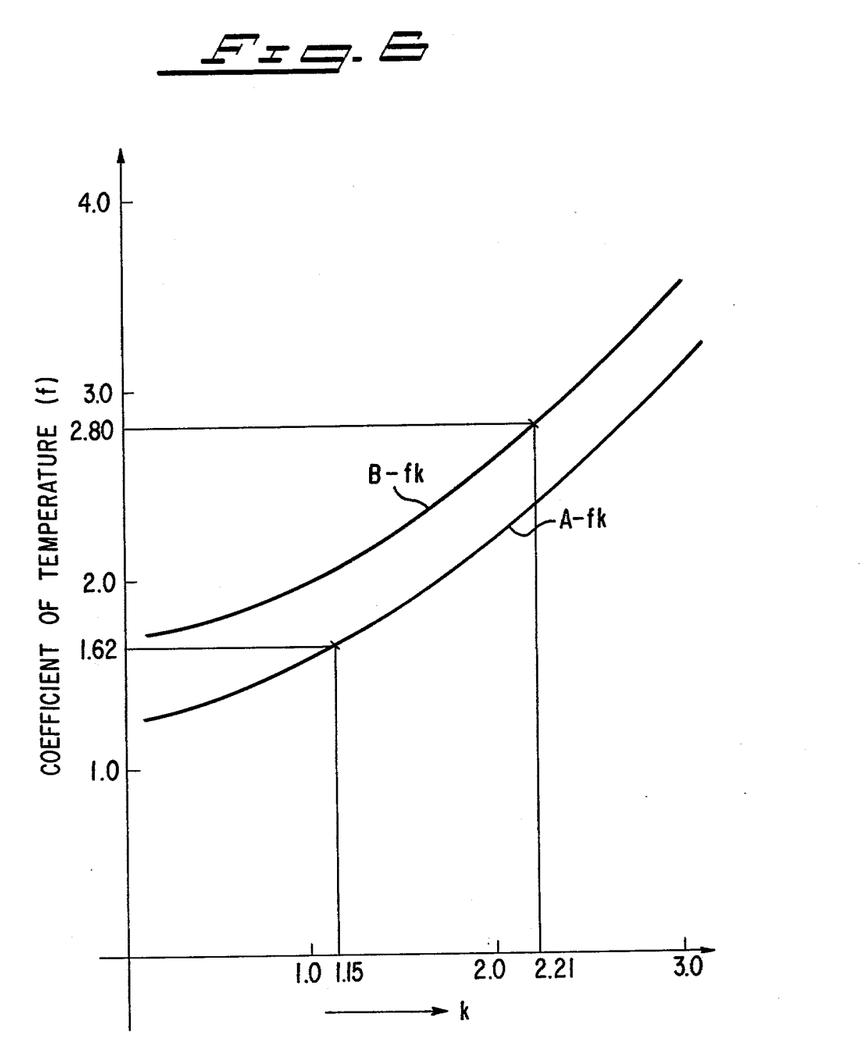
FIG. 6 shows a graph on coefficient of temperature of a tire of this invention in comparison with a conventional tire.

In order to simplify the comparison, A designates the tire of this invention and B designates the conventional tire. Keeping γ, h and Nu constant, by changing "a", the relationship between k and f at ⅛ point is obtained in the form of a graph as shown in FIG. 6 where the quality of A is expressed in A-fk curve and B is B-fk curve. It is very clear from the comparison between A-fk and B-fk that A has a superior quality on limiting heat generation.

Figure 7:
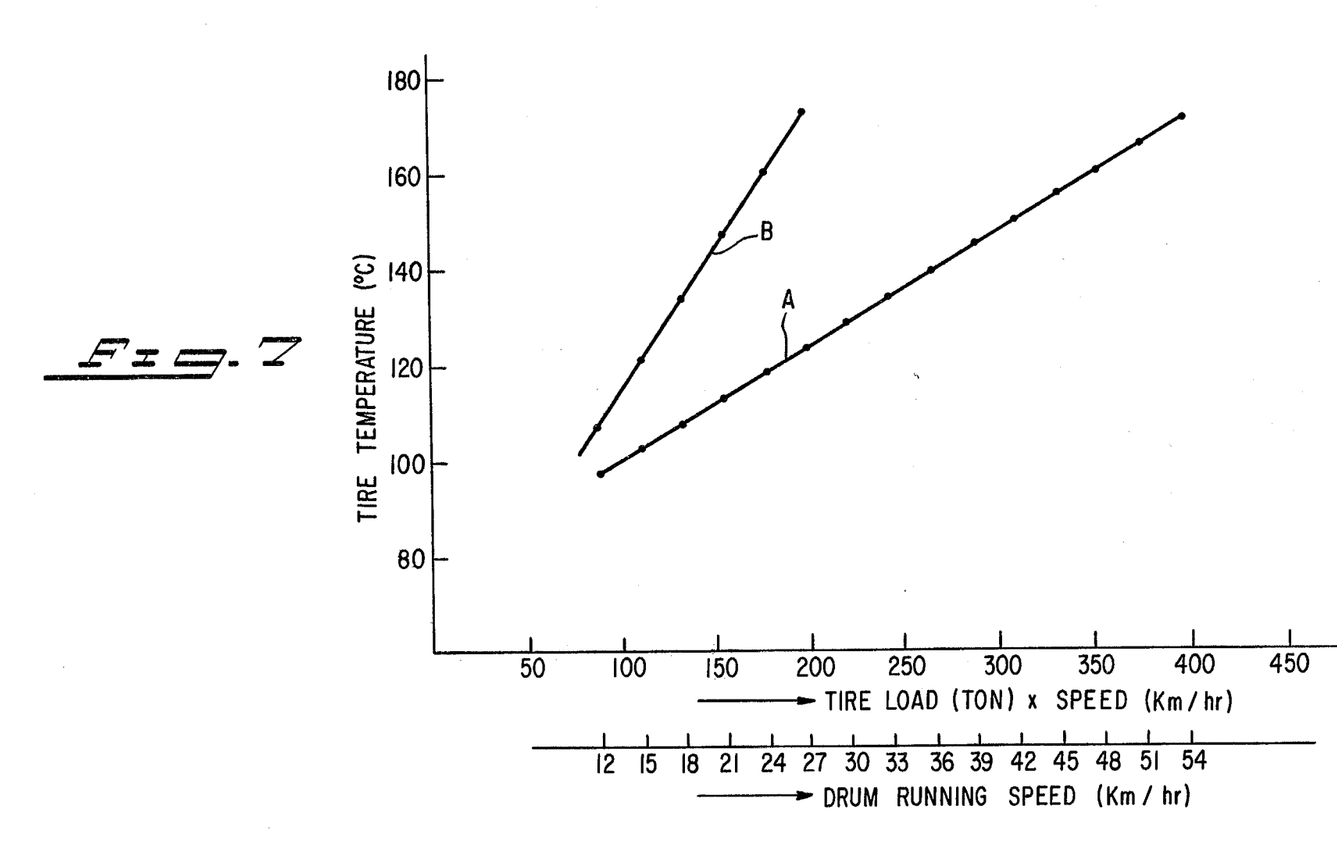
FIG. 7 shows a graph on tire temperature in relation to running speed on a tire of this invention in comparison with a conventional tire.

The results on A and B by way of in-door driving test or drum running test are as shown in FIG. 7. FIG. 7 illustrates the quality of the tires regarding heat generation and aging effect by taking the longitudinal axis on tire temperature and the horizontal axis on product of tire load (ton) and speed (Km/hr). The test was done under the conditions that the starting speed was 12 Km/hr and increased by 3 Km/hr every 48 hours using a drum of 1,701.8 mmφ, air pressure in tire of 5.0 Kg/cm², load of 7,386 Kg (constant). The result was that A got separation after 28 days at running speed of 54 Km/hr, while B got separation after 10 days at running speed of 27 Km/hr.

Accordingly, the above comparison tells that the tire of this invention has a three times longer life at a variety of running speed; moreover, the final speed, when the separation occurred on the tire of this invention was two times faster than the final speed on the conventional tire. This indicates that at a same running speed, the tire of this invention will display even more advantages or longer life over the conventional tires.

As shown above, the tire of this invention has excellent capability on heat release efficiency and longer life to thereby provide a practical solution to the defects that the prior art tire suffered from.

We claim:

1. A bias ply tire for high-speed construction vehicles of a standard size of 16.00–25 or larger and a wide base size of 20.5–25 or larger including a lug type, a semi-lug type and a block type with a ratio of 60–75 percent of an area of contact portion of a tread to an area of said tread wherein the size of said projecting portion of said tread is under the conditions defined by the following formulas:

$1.0 \leq K \leq 1.3$ at ⅛ point $1.0 \leq K \leq 1.6$ at ¼ point

Said "k" designating a quotient of "a", diameter of a maximum circle to be drawn within the width of said projecting portion, by "h" designating height of grooves in said tread at a center of each of said circle along a line perpendicular to a surface of an undertread at a center of each of said circle, and "⅛" and "¼" points designating a dividing point respectively ⅛ and ¼ of the width of a flat projection of said tread from an end of said tread.

2. A bias ply tire for high-speed construction vehicles according to claim 1 wherein k at ⅛ point is approximately equal to 1.15 and k at ¼ approximately equal to 1.51.

3. A bias ply tire for high-speed construction vehicles according to claim 2, wherein the ratio of the area of the projection portion to that of the tread in approximately 64 percent.

* * * * *